United States Patent
Patel et al.

(10) Patent No.: US 11,498,036 B2
(45) Date of Patent: Nov. 15, 2022

(54) GAS LIQUID ABSORPTION DEVICE (GLAD) WITH REPLACEABLE GAS ORIFICE FITTINGS AND SENSORS

(71) Applicant: Flow Control LLC, Beverly, MA (US)

(72) Inventors: Akshaykumar Patel, Santa Ana, CA (US); Derrick Tran, Yorba Linda, CA (US)

(73) Assignee: FLOW CONTROL LLC, Beverly, MA (US)

(*) Notice: Subject to any disclaimer, the term of this patent is extended or adjusted under 35 U.S.C. 154(b) by 314 days.

(21) Appl. No.: 16/830,960

(22) Filed: Mar. 26, 2020

(65) Prior Publication Data
US 2020/0316534 A1    Oct. 8, 2020

Related U.S. Application Data

(60) Provisional application No. 62/823,841, filed on Mar. 26, 2019.

(51) Int. Cl.
*B01F 23/23* (2022.01)
*B01F 23/231* (2022.01)

(52) U.S. Cl.
CPC ... *B01F 23/23122* (2022.01); *B01F 23/231233* (2022.01)

(58) Field of Classification Search
CPC ... B01F 23/2319; B01F 23/23122; A23L 2/54
See application file for complete search history.

(56) References Cited

U.S. PATENT DOCUMENTS

| | | |
|---|---|---|
| 4,350,503 A | 9/1982 | Skoli et al. |
| 4,458,584 A | 7/1984 | Annese et al. |

(Continued)

FOREIGN PATENT DOCUMENTS

| | | |
|---|---|---|
| WO | 96/09111 | 3/1996 |
| WO | 03/030228 A2 | 4/2003 |

(Continued)

OTHER PUBLICATIONS

Descoins, Charles, et al. "Carbonation monitoring of beverage in a laboratory scale unit with on-line measurement of dissolved CO2." Food Chemistry 95.4 (2006): pp. 541-553; https://pdfs.semanticscholar.org/bb66/317fa8c1c57733ff462ea55426c368162948.pdf.

*Primary Examiner* — Robert A Hopkins
(74) *Attorney, Agent, or Firm* — Ware, Fressola, Maguire & Barber LLP (57) ABSTRACT

A gas liquid absorption device (GLAD), featuring a gas inlet manifold, a liquid inlet manifold and a gas/liquid mixing foamer. The gas inlet manifold has a gas inlet configured to receive and provide an inlet gas, and also has a gas foamer cavity formed therein and coupled fluidically to the gas inlet to receive the inlet gas. The liquid inlet manifold has a liquid inlet configured to receive and provide a non-infused liquid, and also has a liquid foamer cavity formed therein and coupled fluidically to the liquid inlet to receive the non-infused liquid. The gas/liquid mixing foamer is configured between the gas inlet manifold and the liquid inlet manifold and arranged in the gas foamer cavity and the liquid foamer cavity. The gas/liquid mixing foamer has a gas foamer wall configured to form a gas receiving foamer chamber that is fluidically coupled to the gas foamer cavity. The gas foamer wall has gas provisioning holes formed therein to provide dispersed inlet gas from the gas receiving foamer chamber. The gas/liquid mixing foamer has a liquid foamer wall configured to form a liquid receiving foamer chamber that is fluidically coupled to the liquid foamer cavity. The liquid foamer wall having liquid provisioning holes formed therein to provide dispersed non-infused liquid from the liquid receiving foamer chamber. The mixing chamber is configured to receive the dispersed inlet gas and the dispersed non-infused liquid, infuse the dispersed inlet gas and the (Continued)

dispersed non-infused liquid, and provide a foamed gas/liquid mixture from the mixing chamber.

18 Claims, 6 Drawing Sheets

(56) References Cited

U.S. PATENT DOCUMENTS

| | | | |
|---|---|---|---|
| RE32,179 E | 6/1986 | Sedam et al. | |
| 5,129,549 A | 7/1992 | Austin | |
| 7,416,170 B2 | 8/2008 | Jablonski et al. | |
| 7,861,740 B2 | 1/2011 | Phallen et al. | |
| 8,348,245 B2 * | 1/2013 | Fischer | B01F 23/232 |
| | | | 261/DIG. 7 |
| 8,728,020 B2 | 5/2014 | Caleffi et al. | |
| 8,833,405 B2 | 9/2014 | Phallen et al. | |
| 8,840,092 B2 | 9/2014 | Kumar et al. | |
| 9,114,368 B2 | 8/2015 | Njaastad et al. | |
| 9,623,383 B1 | 4/2017 | Kleinrichert | |
| 10,017,373 B2 | 7/2018 | Kleinrichert | |
| 10,470,483 B1 * | 11/2019 | Lisiecki | B67D 1/0058 |
| 2013/0108760 A1 | 5/2013 | Kumar et al. | |
| 2013/0270722 A1 | 10/2013 | Phillips et al. | |
| 2017/0190630 A1 | 7/2017 | Jaffel et al. | |
| 2017/0233235 A2 | 8/2017 | Kleinrichert | |
| 2017/0367376 A1 | 12/2017 | Kleinrichert | |
| 2018/0085723 A1 | 5/2018 | Perkins et al. | |
| 2018/0155176 A1 * | 6/2018 | Cook | B67D 1/0031 |
| 2018/0280896 A1 | 10/2018 | Perkins et al. | |
| 2018/0317524 A1 | 11/2018 | Jennings, III | |
| 2019/0135606 A1 | 5/2019 | Perkins et al. | |

FOREIGN PATENT DOCUMENTS

| | | |
|---|---|---|
| WO | 2018/178083 A1 | 10/2018 |
| WO | 2019/014193 A1 | 1/2019 |

* cited by examiner

FIG. 1A: GLAD - Isometric View 1

FIG. 1B: GLAD - Isometric View 1

FIG. 1C: GLAD - Back

FIG. 1D: GLAD - Back

FIG. 1E: GLAD - Right

FIG. 1F: GLAD - Left View

FIG. 1G: GLAD - Bottom View

FIG. 1H: GLAD - Top View

FIG. 2 : GLAD - Cross-Sectional View

FIG. 3 : Exploded View of the GLAD Assembly

*FIG. 4* : The Foamer

FIG. 5: Typical Setup for Gas Infused Beverage System

GAS LIQUID ABSORPTION DEVICE (GLAD) WITH REPLACEABLE GAS ORIFICE FITTINGS AND SENSORS

CROSS-REFERENCE TO RELATED APPLICATION

This application claims benefit to provisional patent application Ser. No. 62/823,841, filed 26 Mar. 2019, which is hereby incorporated by reference in its entirety.

This application relates to Ser. No. 15/938,512, filed 28 Mar. 2018, which claims benefit to Ser. No. 62/477,745, filed 28 Mar. 2017, entitled "Gas/liquid infusion system with intelligent level management and adjustable absorption output," which is hereby incorporated by reference in its entirety.

This application also relates to U.S. Pat. No. 9,033,315, issued 19 May 2015, entitled "Adjustable in-line on demand carbonator chamber for beverage applications," which is hereby incorporated by reference in its entirety.

BACKGROUND OF THE INVENTION

1. Field of the Invention

The present invention relates to a gas liquid absorption device (GLAD), e.g., for mixing, infusing or carbonating beverage liquids (such as coffee, tea, milk, soda, beer, wine, spirits and industrial fluids) with a gas (such as nitrogen (N2), or carbon dioxide (CO2), or a blend of N2 and CO2).

2. Brief Description of Related Art

1) Water Carbonator System with a Tank for beverage applications:

Known beverage water carbonators are designed to dissolve carbon dioxide gas (CO2) and/or Nitrogen gas into water, producing infused water. CO2 gas is delivered through a regulator to the carbonator tank gas inlet fitting. Simultaneously, plain water is pumped into the tank from a vane pump which is fed from a commercial water source. The gas, under pressure, partially dissolves in the water and the result is carbonated and/or nitrogenated water. Some systems include chilling the water before, during, and/or after passing through the carbonator. The output carbonation level produced is constant based on the equilibrium of the gas/liquid established at the temperature and pressure conditions of the system.

2) Inline Carbonator Devices, such as the Assignee's Carbjet (U.S. Pat. No. 9,033,315 B2), have a carbonation chamber and a gas adjustment member to allow gas to be absorbed into liquid:

In particular, this and similar inline devices enable mixing of liquid and gas in a flow through an inline mixing chamber as contrasted with the accumulator tank in the first example above. The principles of operation are similar to the standard carbonator system, but there is no reservoir tank so the carbonation/infusion of the gas into liquid happens on demand as the dispense valve is opened. The gas and liquid streams are combined inline at some point upstream of the dispense valve. Inline devices are often less efficient than traditional carbonator tank designs which lead to excessive breakout when higher levels of infusion are desired. U.S. Pat. No. 9,033,315 B2, entitled "Adjustable in-line on demand carbonation chamber for beverage applications," includes a carbonation chamber in FIGS. 1-2 thereof that is configured to carbonate a liquid and a gas, which is hereby incorporated by reference in its entirety.

Some of the Shortcomings of the Above Mentioned Devices:

The above mentioned device lacks the means to easily add/replace other members such as gas controlling fitting, pressure sensors, pressure relief valve, different type/size of fittings, etc. The adjustable gas member could be difficult to precisely adjust the required amount of gas due to its design and the sizes of the orifices. The mixed product could have inconsistent beverage quality due to fluctuation in gas flow rate.

There is a need in the industry for a better way to infuse gas and liquid for dispensing beverages in restaurants, coffee shops, bars, and convenience stores, etc.

SUMMARY OF THE PRESENT INVENTION

The GLAD according to the present invention can be used to mix/infuse/carbonate beverage liquids such as coffee, tea, milk, soda water, beer, wine, spirit, and industrial fluids with Nitrogen, CO2 or blended gases (N2+CO2) to improve taste and add visual effects to drinks such as foam, cascading, and effervescence.

According to some embodiments of the present invention, the GLAD may include, or take the form of, the following:
  2 main bodies (e.g., a gas manifold and a liquid manifold),
  a center piece (e.g., called a foamer) with 2 sets of small holes,
  3 O-rings to seal gas and liquid between the chambers, and
  2 check valves assemblies to prevent liquid ingress into gas chamber.

Accessories like fittings, pressure sensors, PRV, etc. can be added/changed as optional devices to enhance the operation of the GLAD and improve field installation. The GLAD assembly may be held together by 4 screws and 8 washers.

By way of example, and according to some embodiments of the present invention, the GLAD can be set up in a beverage dispense system (e.g., such as a gas infused beverage system shown in FIG. 5), as follows:
  a gas (e.g., N2, or CO2, or N2+CO2 blend) supply may be connected to the GLAD's gas inlet port via a quick-connect fitting with an integrated fixed orifice;
  a non-infused liquid supply may be connected to the GLAD's liquid inlet port from a keg with or without a pump; and
  a dispense nozzle may be connected to the GLAD's liquid outlet port (e.g., see FIGS. 2 and 3 for complete detail of the GLAD assembly).

All optional electrical components (pressure sensors, pump, solenoid valves, etc.) may be connected to a controller printed circuit board assembly (PCBA).

By way of further example, and according to some embodiments of the present invention, the beverage dispense system may operate as follows:
  Gas first passes through a fixed orifice on a quick-connect fitting and the 2 check valves and disperses through 4 small holes on the foamer into a mixing chamber;
  Non-infused liquid flows into the liquid manifold from a keg either by gas forced or pump, and disperses through 8 holes on the foamer into the mixing chamber;
  Gas and liquid are infused in the mixing chamber;
  The infused product then flows through a liquid outlet port to a dispense nozzle into a cup.

The 2 check valves are used to prevent back flow of liquid into a gas chamber which can cause blockage of the gas flow and therefore affects the infusion process. The Pressure Relief Valve (PRV) is used to release a pre-set high pressure to prevent damage to the components and system. The pressure sensors (e.g., for the gas and liquid) are used to monitor/measure the pressures by a Controller of the PCBA in order to effectively control the infusion process. Foam height, foam quality, and time of gas cascading in the cup are parts of the drink quality to be measured.

In summary, the present invention provides flexibility for the applications by means to monitor/control the infusion process with pressure sensors, safety, and easily adjust the gas flow rate by replacing the gas fitting/orifice. It also improves the drink quality and performance consistency from drink to drink and over a period of time. In addition, it also has multiple ways of mounting for ease of installation in the field.

Particular Embodiments

The GLAD

By way of example, and according to some embodiments, the present invention may include, or take the form of, a gas liquid absorption device (GLAD), featuring a gas inlet manifold, a liquid inlet manifold and a gas/liquid mixing foamer.

The gas inlet manifold has a gas inlet configured to receive and provide an inlet gas, and also has a gas foamer cavity formed therein and coupled fluidically to the gas inlet to receive the inlet gas.

The liquid inlet manifold has a liquid inlet configured to receive and provide a non-infused liquid, and also has a liquid foamer cavity formed therein and coupled fluidically to the liquid inlet to receive the non-infused liquid.

The gas/liquid mixing foamer is configured between the gas inlet manifold and the liquid inlet manifold and arranged in the gas foamer cavity and the liquid foamer cavity.

The gas/liquid mixing foamer has a gas foamer wall configured to form a gas receiving foamer chamber that is fluidically coupled to the gas foamer cavity. The gas foamer wall has gas provisioning holes formed therein to provide dispersed inlet gas from the gas receiving foamer chamber.

The gas/liquid mixing foamer has a liquid foamer wall configured to form a liquid receiving foamer chamber that is fluidically coupled to the liquid foamer cavity. The liquid foamer wall having liquid provisioning holes formed therein to provide dispersed non-infused liquid from the liquid receiving foamer chamber.

The mixing chamber is configured to receive the dispersed inlet gas and the dispersed non-infused liquid, infuse the dispersed inlet gas and the dispersed non-infused liquid, and provide a foamed gas/liquid mixture from the mixing chamber.

By way of further example, the GLAD may also include one or more of the following features:

The mixing chamber may be configured in at least part of the gas inlet manifold.

The gas inlet manifold may include a gas manifold wall configured to form the mixing chamber, including a cylindrical wall.

The gas/liquid mixing foamer may include a center wall configured to separate fluidically the gas receiving foamer chamber and the liquid receiving foamer chamber, e.g., so the inlet gas and the inlet liquid can be separately provided to the mixing chamber.

The GLAD may include a gas O-ring configured between the gas foamer wall and a cylindrical wall of the gas foamer cavity.

The GLAD may include a liquid O-ring configured between the liquid foamer wall and a corresponding cylindrical wall of the liquid foamer cavity.

The GLAD may include a gas inlet fitting configured in the gas inlet to provide the inlet gas, including where the gas inlet fitting is a quick-connect gas inlet fitting.

The GLAD may include a check valve assemblies, e.g., including an inlet check valve configured in the gas inlet, or a foamer check valve configured in the gas receiving foamer chamber, or both the inlet check valve configured in the gas inlet and the foamer check valve configured in the gas receiving foamer chamber.

The GLAD may include a gas pressure sensor configured in the gas inlet manifold to sense gas pressure of the inlet gas provided to the gas/liquid foamer.

The GLAD may include a liquid outlet fitting coupled to the gas inlet manifold and configured to provide the foamed gas/liquid mixture from the mixing chamber, including where the liquid outlet fitting is a liquid outlet quick-fitting.

The GLAD may include a pressure relief valve (PRV) coupled to the gas inlet manifold and configured to sense mixing chamber pressure of the foamed gas/liquid mixture in the mixing chamber.

The GLAD may include a liquid inlet fitting configured in the liquid inlet manifold to provide the inlet liquid, including where the liquid inlet fitting is a liquid inlet quick-fitting.

The GLAD may include a liquid pressure sensor configured in the liquid inlet manifold to sense liquid pressure of the inlet liquid provided to the gas/liquid foamer.

The gas provisioning holes may include four gas provisioning holes. The four gas provisioning holes may be in an equi-distant and symmetrical arrangement around the gas foamer wall.

The liquid provisioning holes may include eight liquid provisioning holes. The liquid provisioning holes may be configured in an equi-distant and symmetrical arrangement around the liquid foamer wall.

A Gas Infused Beverage System By way of example, and according to some embodiments, the present invention may include, or take the form of, a gas infused beverage system having the GLAD according to the present invention. By way of further example, the GLAD may also include one or more of the aforementioned features.

BRIEF DESCRIPTION OF THE DRAWING

The drawing, which is not necessarily drawn to scale, includes the following Figures.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

By way of example, and according to some embodiments, the present invention may include, or take the form of, a gas liquid absorption device (GLAD) generally indicated as 10, featuring a gas inlet manifold 20, a liquid inlet manifold 30, a gas/liquid mixing foamer 40 and a mixing chamber 50, e.g., consistent with that shown in FIGS. 1A thru 1H, as well as FIGS. 2-5.

The gas inlet manifold 20 has a gas inlet 22 configured to receive and provide an inlet gas, and also has a gas foamer cavity 24 formed therein and coupled fluidically to the gas inlet 22 to receive the inlet gas.

The liquid inlet manifold 30 has a liquid inlet 32 configured to receive and provide a non-infused liquid, and also has a liquid foamer cavity 34 formed therein and coupled fluidically to the liquid inlet 32 to receive the non-infused liquid.

Figure 3:
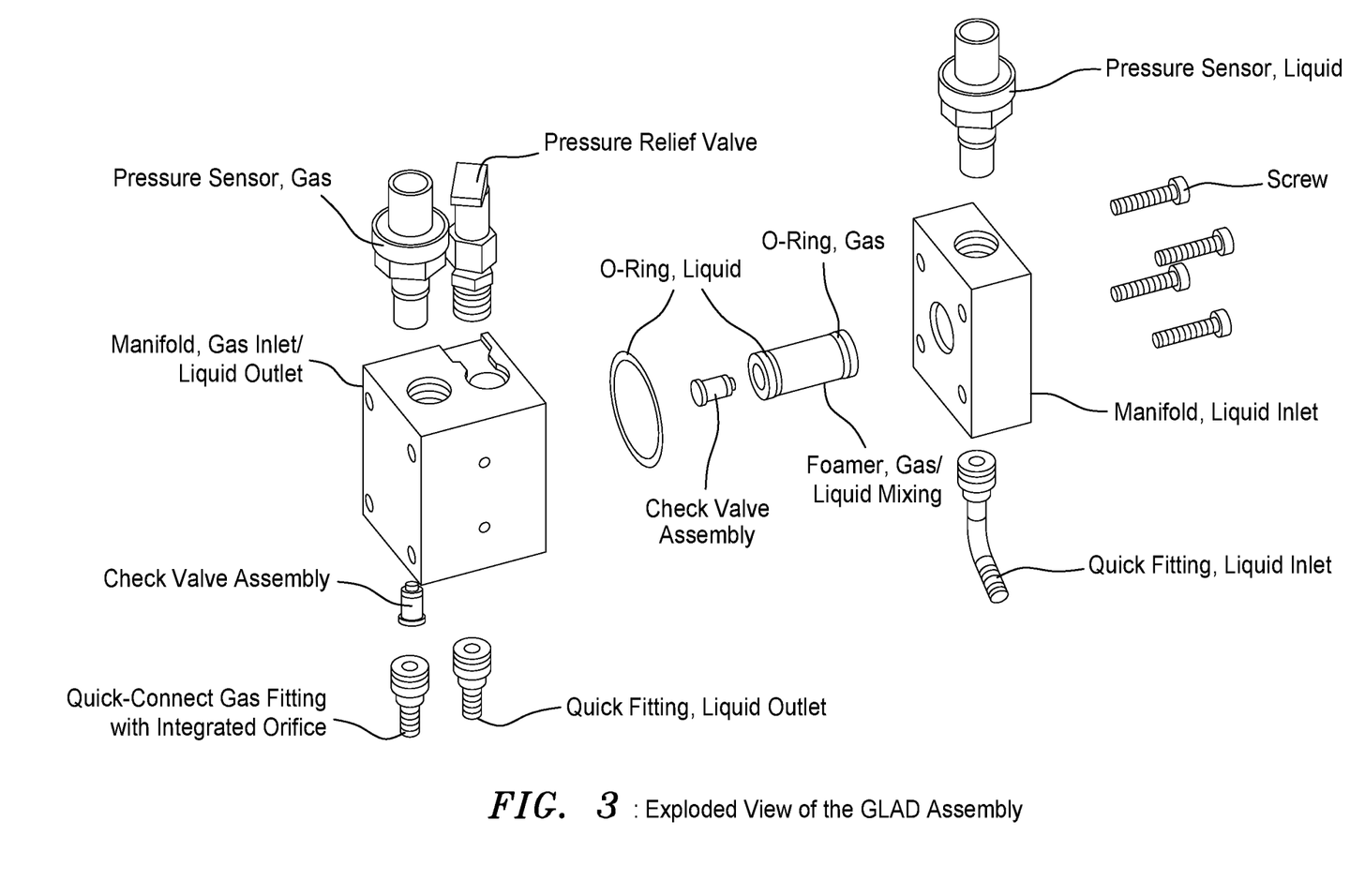
FIG. 3 shows an exploded view of the GLAD shown in FIG. 1.

The gas inlet manifold 20 and liquid inlet manifold 30 may be coupled together using screws and/or washers, e.g., consistent with that shown in FIG. 3.

The gas/liquid mixing foamer 40 is configured between the gas inlet manifold 20 and the liquid inlet manifold 30 and arranged in the gas foamer cavity 24 and the liquid foamer cavity 34.

The gas/liquid mixing foamer 40 has a gas foamer wall 42 configured to form a gas receiving foamer chamber 44 that is fluidically coupled to the gas foamer cavity 34. The gas foamer wall 42 has gas provisioning holes, one of which in labeled 42a, formed therein to provide dispersed inlet gas from the gas receiving foamer chamber 44.

The gas/liquid mixing foamer 40 has a liquid foamer wall 46 configured to form a liquid receiving foamer chamber 48 that is fluidically coupled to the liquid foamer cavity 34. The liquid foamer wall 46 has liquid provisioning holes, one of which in labeled 46a, formed therein to provide dispersed non-infused liquid from the liquid receiving foamer chamber 48.

Figures 1A, 1B:
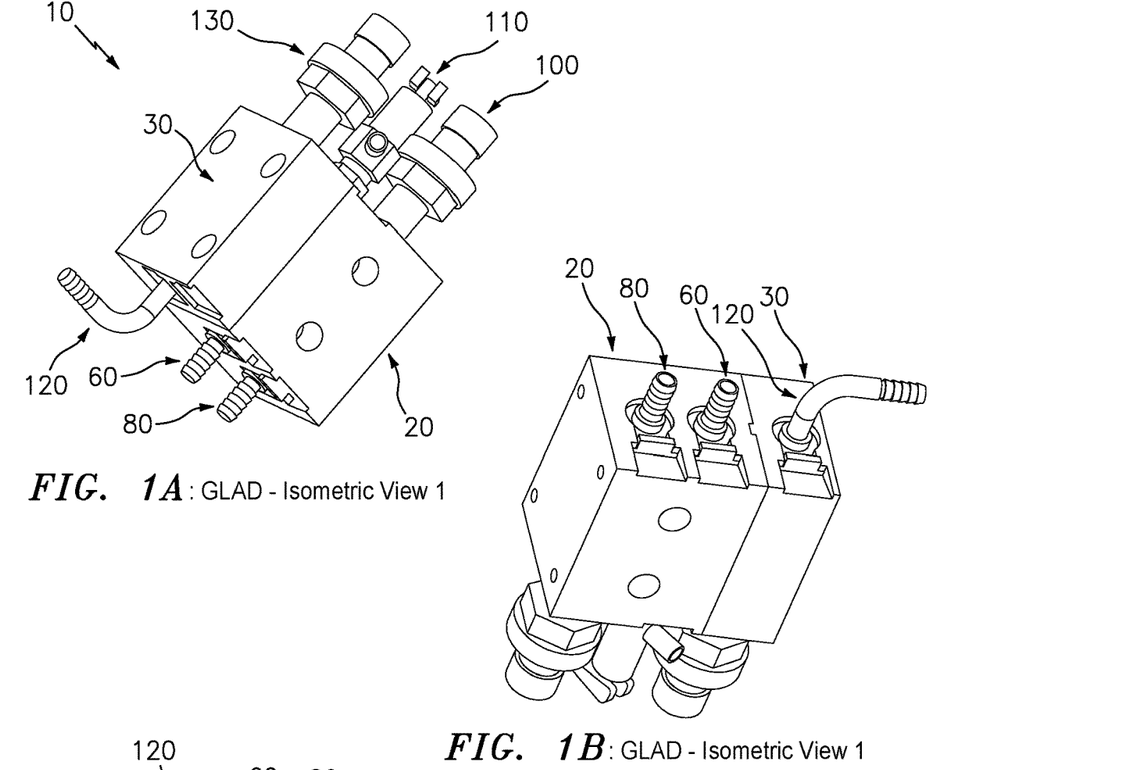
FIG. 1A shows a first isometric view of a GLAD, according to some embodiments of the present invention.
FIG. 1B shows a second isometric view of the GLAD shown in FIG. 1.
Figure 1C:
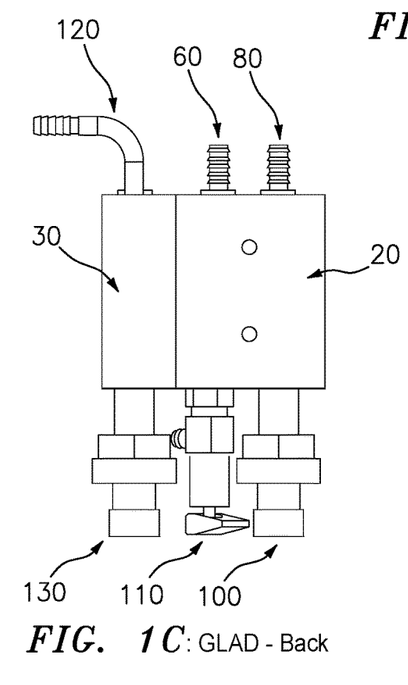
FIG. 1C shows a back view of the GLAD shown in FIG. 1.
Figure 1D:
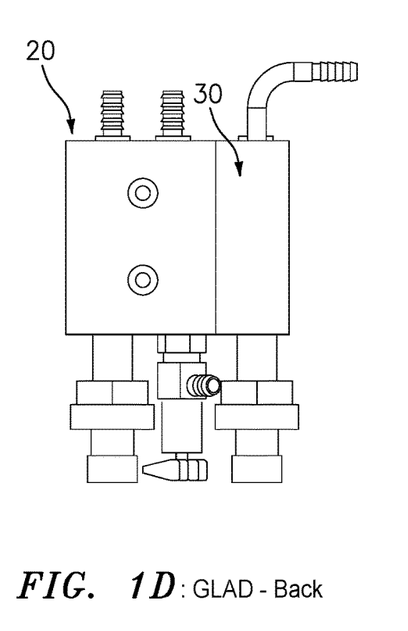
FIG. 1D shows a front view of the GLAD shown in FIG. 1.
Figure 1E:
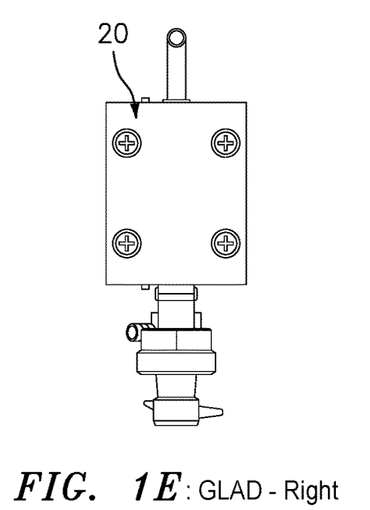
FIG. 1E shows a right view of the GLAD shown in FIG. 1.
Figure 1F:
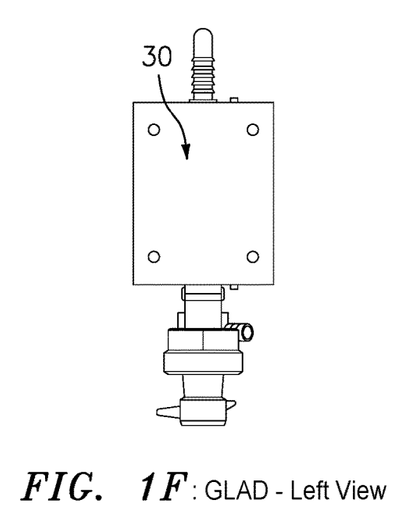
FIG. 1F shows a left view of the GLAD shown in FIG. 1.
Figure 1G:
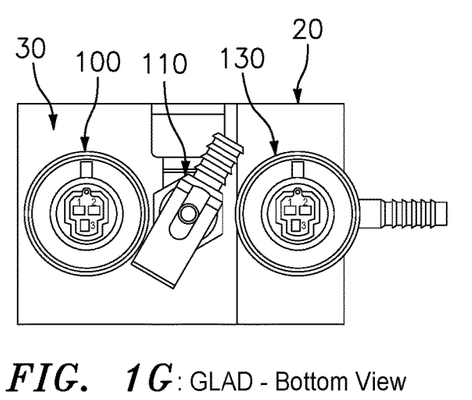
FIG. 1G shows a bottom view of the GLAD shown in FIG. 1.
Figure 1H:
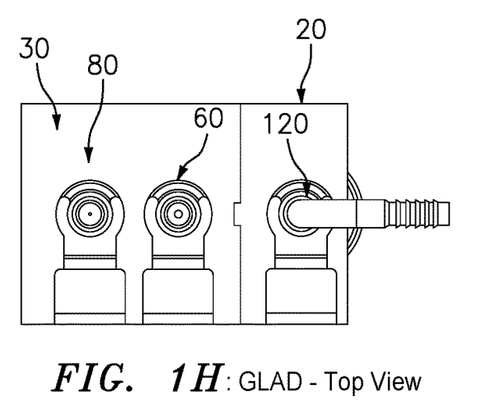
FIG. 1H shows a top view of the GLAD shown in FIG. 1.
Figure 2:
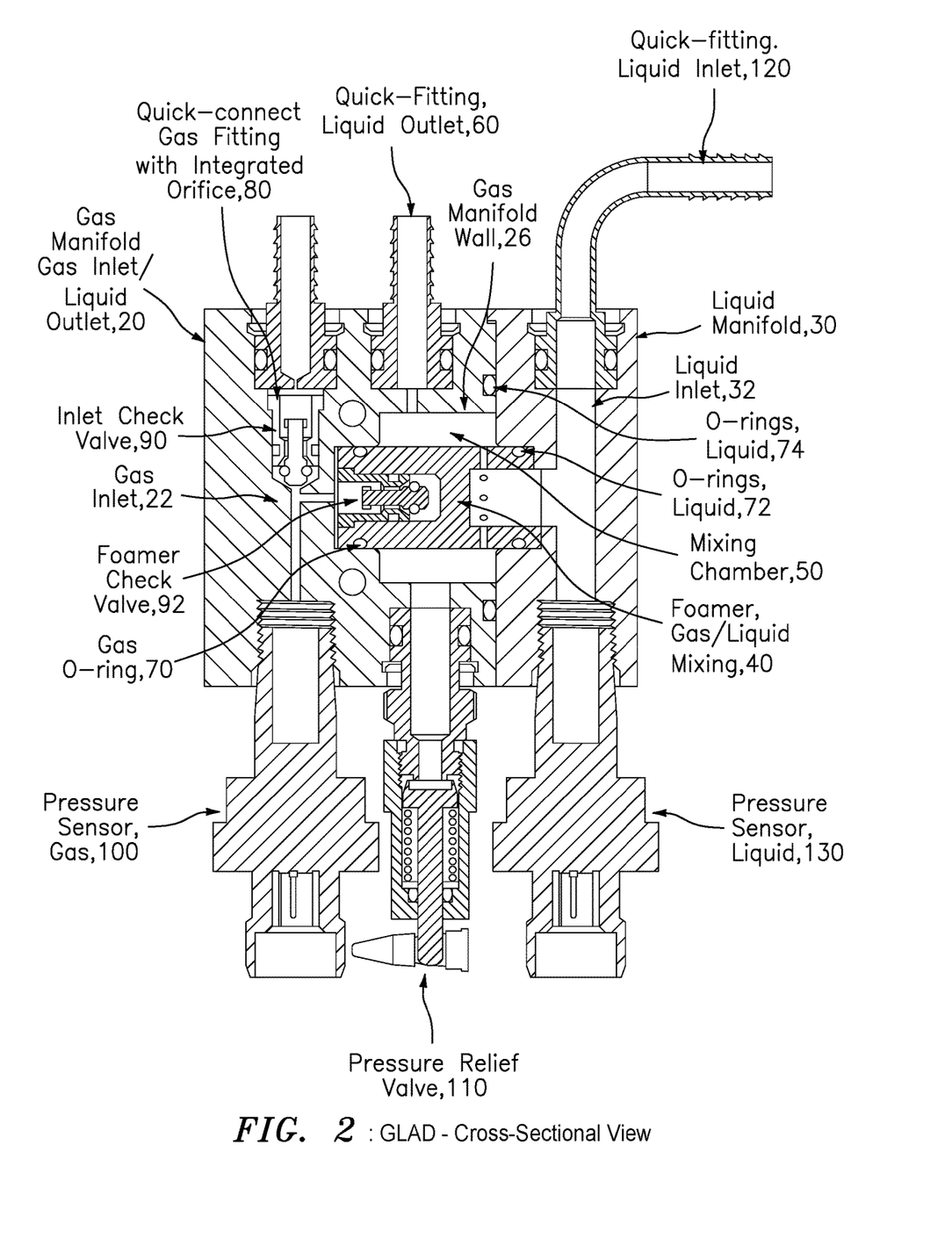
FIG. 2 shows a cross-sectional view of the GLAD shown in FIG. 1.

The mixing chamber 50 is configured to receive the dispersed inlet gas and the dispersed non-infused liquid, infuse the dispersed inlet gas and the dispersed non-infused liquid, and provide a foamed gas/liquid mixture from the mixing chamber 50 to a liquid outlet quick-fitting 60, e.g., as shown in FIG. 2.

The mixing chamber 50 may be configured in at least part of the gas inlet manifold 20, e.g., consistent with that shown in FIG. 2. Embodiments are envisioned, and the scope of the invention is intended to include, the mixing chamber 50 being configured in the gas inlet manifold 20 as shown in FIG. 2, as well as being configured in at least part of the gas inlet manifold 20 and at least part of the liquid inlet chamber 30. In other words, embodiments are envisioned, and the scope of the invention is intended to include, the mixing chamber 50 being configured in at least part of the liquid inlet manifold 30.

The gas inlet manifold 20 may include a gas manifold wall 26 configured to form the mixing chamber 50, e.g., consistent with that shown in FIG. 2.

The gas/liquid mixing foamer 40 may include a center wall 49 configured to separate fluidically the gas receiving foamer chamber 44 and the liquid receiving foamer chamber 48.

Figure 4:
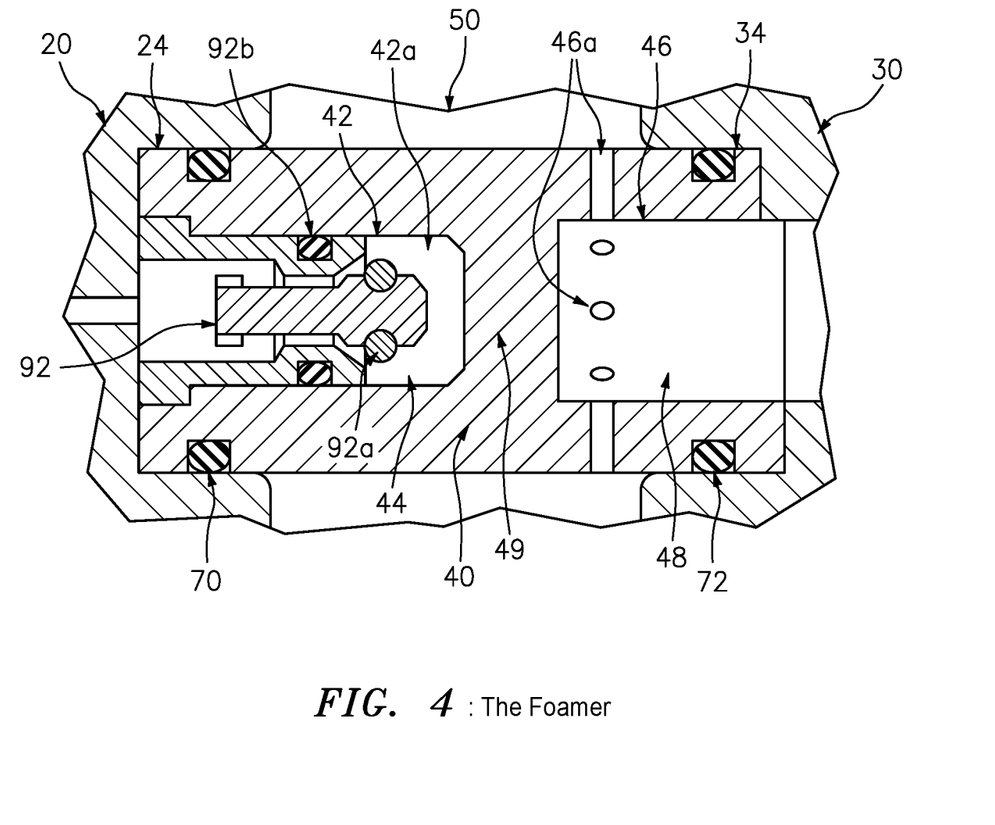
FIG. 4 shows an exploded cross-section view of the gas/liquid mixing foamer shown in FIG. 2.

The GLAD 10 may include a gas O-ring 70 configured between the gas foamer wall 42 and the gas foamer cavity 24, e.g., consistent with that shown in FIG. 4 that shows the gas O-ring 70 arranged in a channel formed in the gas foamer wall 42.

The GLAD 10 may include a liquid O-ring 72 configured between the liquid foamer wall 46 and the liquid foamer cavity 34, as well as a corresponding liquid O-ring 74 configured between the gas inlet manifold 20 and the liquid inlet manifold 30, e.g. consistent with that shown in FIG. 2. See also FIG. 4 that shows the gas O-ring 72 arranged in a corresponding channel formed in the liquid foamer wall 46.

The GLAD 10 may include a gas inlet fitting 80 configured in the gas inlet 22 to provide the inlet gas, including where the gas inlet fitting is a quick-connect gas inlet fitting, e.g. consistent with that shown in FIGS. 2 and 3.

The GLAD 10 may include a check valve assembly having an inlet check valve 90 configured in the gas inlet 22, or include a foamer check valve 92 configured in the gas receiving foamer chamber 44, or include both the inlet check valve 90 configured in the gas inlet 22 and the foamer check valve 92 configured in the gas receiving foamer chamber 44, e.g. consistent with that shown in FIG. 2.

The GLAD 10 may include a gas pressure sensor 100 configured in the gas inlet manifold 20 to sense gas pressure of the inlet gas provided to the gas/liquid foamer 40, e.g. consistent with that shown in FIG. 2.

The liquid outlet fitting 60 may be coupled to the gas inlet manifold 20 and configured to provide the foamed gas/liquid mixture from the mixing chamber 50, including where the liquid outlet fitting 60 is a liquid outlet quick-fitting, e.g. consistent with that shown in FIGS. 2 and 3.

The GLAD 10 may include a pressure relief valve 110 coupled to the gas inlet manifold 20 and configured to sense mixing chamber pressure of the foamed gas/liquid mixture in the mixing chamber 50, e.g. consistent with that shown in FIGS. 2 and 3.

The GLAD 10 may include a liquid inlet fitting 120 configured in the liquid inlet manifold 30 to provide the inlet liquid, including where the liquid inlet fitting 120 is a liquid inlet quick-fitting, e.g. consistent with that shown in FIGS. 2 and 3.

The GLAD 10 may include a liquid pressure sensor 130 configured in the liquid inlet manifold 30 to sense liquid pressure of the inlet liquid provided to the gas/liquid foamer 40, e.g. consistent with that shown in FIGS. 2 and 3.

The gas provisioning holes 42a may include four gas provisioning holes, e.g. consistent with that shown in FIGS. 2 and 4. By way of example, the four gas provisioning holes 42a are configured in an equi-distant and symmetrical arrangement around the gas foamer wall. By way of further example, the gas provisioning holes 42a may be dimensioned as 0.020" holes, although the scope of the invention is not intended to be limited to any particular size of the holes.

The liquid provisioning holes 46a may include eight liquid provisioning holes, e.g. consistent with that shown in FIGS. 2 and 4. By way of example, the liquid provisioning holes 46a may be configured in an equi-distant and symmetrical arrangement around the liquid foamer wall. By way of further example, the gas provisioning holes 46a may be dimensioned as 0.040" holes, although the scope of the invention is not intended to be limited to any particular size of the holes.

The Manifolds 20, 30

The manifolds 20, 30 are configured or form as molded units, including plastic injection molded units.

Figure 5:
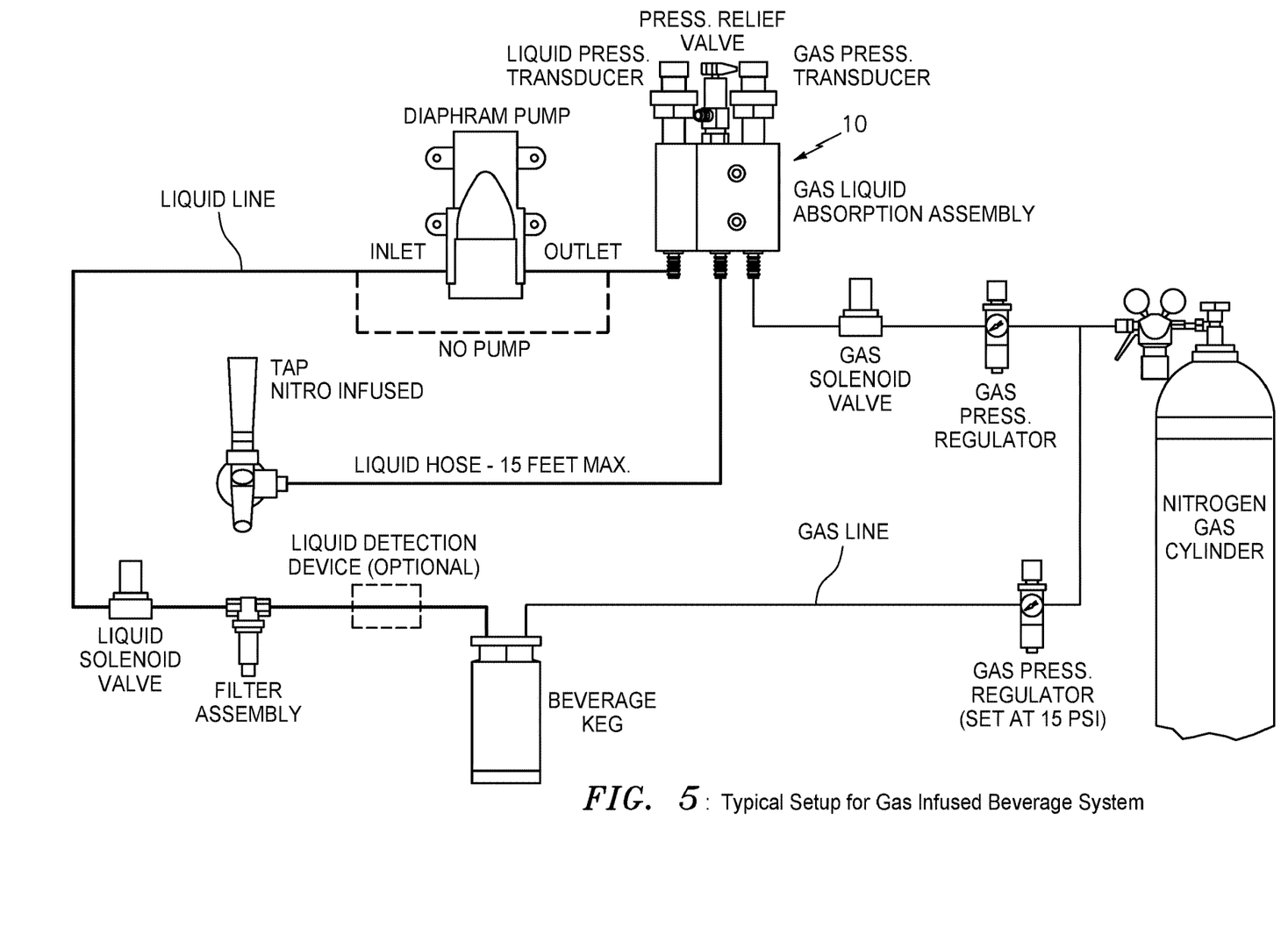
FIG. 5 shows a diagram of a Gas Infused Beverage System having the GLAD shown in FIG. 1A, according to some embodiments of the present invention.

FIG. 5: Gas Infused Beverage System

FIG. 5 shows a typical setup for a gas infused beverage system having a GLAD 10, e.g., consistent with that shown in FIGS. 1A thru 4, and according to the present invention.

In the gas infused beverage system in FIG. 5, the GLAD 10 is configured between a gas solenoid valve and a diaphragm pump and provides the foamed gas/liquid mixture from the mixing chamber 50 (FIG. 2) via a liquid hose to a tap, e.g., including a nitro infused tap.

The gas solenoid receives gas from a gas cylinder via a gas pressure regulator. The gas from the gas cylinder is also provided to a beverage keg via a corresponding gas pressure regulator.

The diaphragm pump has an inlet that receives liquid from the beverage keg via liquid solenoid valve and a filter assembly. The diaphragm has an outlet that provides the pumped liquid to the GLAD 10.

Replaceable Fittings and Sensors

The GLAD 10 also has easily replaceable fittings and sensors, e.g., including a gas orifice fitting, liquid orifice fitting, gas pressure sensor, and liquid pressure sensor.

Liquid and Gas Pressure Sensors and Other Devices

Liquid and gas pressure sensors are known in the art, and the scope of the invention is not intended to be limited to any particular type or kind thereof either now known or later developed in the future.

Motor driven pumps, infusion tank/vessels, etc. are also known in the art, and the scope of the invention is not intended to be limited to any particular type or kind thereof either now known or later developed in the future.

Possible Applications

Possible applications include the following:

Gas (N2, CO2, N2+CO2) infused beverages such as coffee, tea, milk, beer, soda, juice, water, beer, wine, sprit, industrial fluids, etc.

Infusing CO2 or other gases such as Nitrogen into liquids for beverages water, soda, beer, coffee, tea, milk and yogurt based.

Infusing CO2 or other Gases such as Nitrogen into liquids for increasing the effectiveness of cleaning, sanitizing, etc. for example general surface cleaning, soil extraction, beverage line cleaning, water purification.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A gas liquid absorption device (GLAD), comprising:
   a gas inlet manifold having a gas inlet cavity formed therein and configured to receive a gas inlet fitting to and provide an inlet gas into a gas inlet, having a gas pressure sensor cavity formed therein and configured to receive a gas pressure sensor to sense the pressure of the inlet gas received in the gas inlet, and also having a gas foamer cavity formed therein and coupled fluidically to the gas inlet to receive the inlet gas;
   a liquid inlet manifold having a liquid inlet cavity formed therein and configured to receive a liquid inlet fitting to provide a non-infused liquid into a liquid inlet, having a liquid pressure sensor cavity formed therein and configured to receive a liquid pressure sensor to sense the pressure of the non-infused liquid received in the liquid inlet, and also having a liquid foamer cavity formed therein and coupled fluidically to the liquid inlet to receive the non-infused liquid;
   a gas/liquid mixing foamer configured between the gas inlet manifold and the liquid inlet manifold and arranged in the gas foamer cavity and the liquid foamer cavity, the gas/liquid mixing foamer having a gas foamer wall configured to form a gas receiving foamer chamber that is fluidically coupled to the gas foamer cavity, the gas foamer wall having one or more gas provisioning holes formed therein to provide dispersed inlet gas from the gas receiving foamer chamber, the gas/liquid mixing foamer having a liquid foamer wall configured to form a liquid receiving foamer chamber that is fluidically coupled to the liquid foamer cavity, the liquid foamer wall having one or more liquid provisioning holes formed therein to provide dispersed non-infused liquid from the liquid receiving foamer chamber; and
   a mixing chamber formed in at least part of the gas inlet manifold and configured to receive the dispersed inlet gas and the dispersed non-infused liquid, infuse the dispersed inlet gas and the dispersed non-infused liquid, and provide a foamed gas/liquid mixture from the mixing chamber.

2. A gas liquid absorption device (GLAD) according to claim 1, wherein the mixing chamber is configured between at least part of the gas inlet manifold and at least part of the liquid foamer wall.

3. A gas liquid absorption device (GLAD) according to claim 1, wherein the gas inlet manifold includes a gas manifold wall configured to form the mixing chamber.

4. A gas liquid absorption device (GLAD) according to claim 1, wherein the foamer includes a center wall configured to separate fluidically the gas receiving foamer chamber and the liquid receiving foamer chamber.

5. A gas liquid absorption device (GLAD) according to claim 1, wherein the GLAD comprises a gas O-ring configured between the gas foamer wall and the gas foamer cavity.

6. A gas liquid absorption device (GLAD) according to claim 1, wherein the GLAD comprises a liquid O-ring configured between the liquid foamer wall and the liquid foamer cavity.

7. A gas liquid absorption device (GLAD) according to claim 1, wherein the GLAD comprises the gas inlet fitting configured in the gas inlet cavity to provide the inlet gas to the gas inlet, including where the gas inlet fitting is a quick-connect gas inlet fitting with an integrated orifice.

8. A gas liquid absorption device (GLAD) according to claim 1, wherein the GLAD comprises a check valve assembly having an inlet check valve configured in the gas inlet, or having a foamer check valve configured in the gas receiving foamer chamber, or having both the inlet check valve configured in the gas inlet and the foamer check valve configured in the gas receiving foamer chamber.

9. A gas liquid absorption device (GLAD) according to claim 1, wherein the GLAD comprises the gas pressure sensor configured in the gas pressure sensor cavity to sense gas pressure of the inlet gas provided to the gas/liquid foamer.

10. A gas liquid absorption device (GLAD) according to claim 1, wherein the GLAD comprises the liquid outlet fitting configured in liquid outlet cavity of the gas inlet manifold and configured to provide the foamed gas/liquid mixture from the mixing chamber, including where the liquid outlet fitting is a liquid outlet quick-fitting.

11. A gas liquid absorption device (GLAD) according to claim 1, wherein the GLAD comprises the pressure relief valve configured in the pressure relief valve cavity of the gas inlet manifold.

12. A gas liquid absorption device (GLAD) according to claim 1, wherein the GLAD comprises the liquid inlet fitting configured in the liquid inlet fitting cavity of the liquid inlet manifold to provide the inlet liquid to the liquid inlet, including where the liquid inlet fitting is a liquid inlet quick-fitting.

13. A gas liquid absorption device (GLAD) according to claim 1, wherein the GLAD comprises the liquid pressure sensor configured in the liquid pressure sensor cavity of the liquid inlet manifold to sense liquid pressure of the inlet liquid provided to the gas/liquid foamer.

14. A gas liquid absorption device (GLAD) according to claim 1, wherein the one or more gas provisioning holes include more than two gas provisioning holes.

15. A gas liquid absorption device (GLAD) according to claim 14, wherein the more than two gas provisioning holes are configured in an equi-distant and symmetrical arrangement around the gas foamer wall.

16. A gas liquid absorption device (GLAD) according to claim 1, wherein the one or more liquid provisioning holes include more than two liquid provisioning holes.

17. A gas liquid absorption device (GLAD) according to claim 16, wherein the more than two liquid provisioning holes are configured in an equi-distant and symmetrical arrangement around the liquid foamer wall.

18. A gas liquid absorption device (GLAD) according to claim 1, wherein the GLAD forms part of a gas infused beverage system or an industrial system.

\* \* \* \* \*